US007191614B2

(12) United States Patent
Hess et al.

(10) Patent No.: US 7,191,614 B2
(45) Date of Patent: Mar. 20, 2007

(54) METHOD AND APPARATUS FOR CHILLING DRAUGHT BEVERAGES

(75) Inventors: Markus Hess, Thornhill (CA); Phil Carter, King City (CA); Sam Chiusolo, Port Perry (CA)

(73) Assignee: Icefloe Technologies Inc., Mississauga (CA)

( * ) Notice: Subject to any disclaimer, the term of this patent is extended or adjusted under 35 U.S.C. 154(b) by 71 days.

(21) Appl. No.: 11/123,030

(22) Filed: May 6, 2005

(65) Prior Publication Data

US 2006/0059940 A1 Mar. 23, 2006

(51) Int. Cl.
*B60H 1/32* (2006.01)

(52) U.S. Cl. ........................ 62/393; 62/434; 222/146.6

(58) Field of Classification Search .......... 62/389–400, 62/430–439; 222/146.6
See application file for complete search history.

(56) References Cited

U.S. PATENT DOCUMENTS 1,957,081 A * 5/1934 Schneible .................... 62/306
2,331,834 A * 10/1943 Harr ............................ 62/396
5,228,312 A * 7/1993 Williams ...................... 62/390
5,524,452 A * 6/1996 Hassell et al. ................ 62/389
5,564,602 A * 10/1996 Cleland et al. .......... 222/146.6
5,743,107 A * 4/1998 Kyees .......................... 62/390
6,698,229 B2 * 3/2004 Renken et al. ................ 62/390
6,857,278 B2 * 2/2005 Gruber et al. ................ 62/99

* cited by examiner

*Primary Examiner*—William E. Tapolcai
(74) *Attorney, Agent, or Firm*—Dimock Stratton LLP; Adrian M. Kaplan

(57) ABSTRACT

The present invention provides an apparatus for delivering a beverage under pressure from a container to a dispensing means. The apparatus has a heat exchanger, a tank for holding a quantity of a coolant fluid and a reservoir for holding a quantity of the beverage. The reservoir is located in the tank for submersion in the coolant fluid. A first conduit delivers the beverage from the container to the heat exchanger while a second conduit delivers beverage to the reservoir. A third conduit delivers beverage from the reservoir to the dispensing means. The invention allows for the delivery of cold beverage form the container over a distance to the dispensing means.

15 Claims, 3 Drawing Sheets

METHOD AND APPARATUS FOR CHILLING DRAUGHT BEVERAGES

FIELD OF THE INVENTION

The present invention relates to apparatuses and processes for cooling and dispensing beverages.

BACKGROUND OF THE INVENTION

Draught beverages in restaurants, bars, stadiums and other public facilities are dispensed using systems that consist of a storage container that is kept cool in a remote refrigerator. Typically, a cooled supply line takes the beverage to a dispensing faucet. Generally, the beverages are stored in containers that are kept in remote walk-in refrigerators that are also used to chill foods as required by the facility's kitchen. Drinks may be dispensed at a location several hundred feet away from the storage container. The beverage trunk line used to transport the beverage to the dispensing tap is generally made up of a multi-line insulated construction that contains two central cooling liquid lines that will bring a cold glycol/water mixture or ice water to the dispensing faucet and back to maintain the beverage's temperature. This system has the drawback of providing inconsistent cooling performance. This is due to the fact that the temperature inside the walk-in cooler can fluctuate widely as personnel enter and exit during busy times. Also, the beverage trunk line can travel through areas of varying ambient temperatures thereby raising the beverage temperature.

There have been attempts to overcome these problems. These attempts have included the use of a heat exchanger placed near the tap to chill the beverage with a glycol/water mixture or ice water just before it is dispensed. These methods also have drawbacks. Efficient heat exchangers rely on exposing a large surface area of beverage to the cooling liquid. This inherently limits the volume of beverage that can be reasonably kept inside an efficient heat exchanger. Beverages are poured in batches or servings and the dwell time between servings enhances cooling rates. If the frequency of servings becomes too great, the temperature of the beverage will increase as dwell time is minimized. Usually, only a fraction of the volume of a full serving resides in the heat exchanger. This fraction of the beverage will mix with any warm beverage that is found between the heat exchanger and the tap. It will also mix with beverage that passes quickly through the heat exchanger with a limited or no dwell time. This results in a beverage being served at temperatures warmer than desired.

There is therefore a need for a beverage dispensing apparatus that dispenses cold beverage servings even where the beverage must be delivered over a significant distance and where there are significant periods of time between consecutive pours.

SUMMARY OF THE INVENTION

The present invention provides a method and apparatus for delivering a beverage under pressure through a distribution conduit to a dispensing means. The beverage is preferably a carbonated beverage and most preferably is beer. The apparatus of the present invention has a heat exchanger and a reservoir. The reservoir is submerged in a coolant fluid located in a housing. Preferably, the heat exchanger is also submerged in coolant fluid. The beverage is transmitted through a conduit from a container through the heat exchanger then through the reservoir to a dispensing means. The reservoir holds a quantity of beverage between dispensing events. This provides additional cooling between such dispensing events.

According to one aspect of the present invention, there is provided an apparatus for delivering a beverage under pressure from a container to a dispensing means comprising:

a heat exchanger defining a first passageway having an inlet and an outlet through which the beverage may be delivered, the heat exchanger further defining a second passageway having an inlet and an outlet for delivering a coolant fluid through the heat exchanger in sufficient proximity to the first passageway to permit heat exchange between the coolant fluid and the beverage;

a tank for holding a quantity of a coolant fluid;

a reservoir for holding a quantity of the beverage, the reservoir being located in the tank for submersion in said coolant fluid, the reservoir defining an inlet and an outlet and a passageway between the inlet and the outlet;

a first conduit for delivering the beverage from the container to the inlet of the first passageway of the heat exchanger;

a second conduit for delivering beverage from the outlet of the heat exchanger to the inlet of the reservoir;

a third conduit for delivering beverage from the reservoir to the dispensing means.

According to another aspect of the present invention, there is provided an apparatus for delivering a beverage under pressure from a container to a dispensing means comprising:

a housing defining a chamber for holding a quantity of a coolant fluid, the housing further defining an inlet and an outlet;

a heat exchanger located in the chamber, the heat exchanger defining a inlet, an outlet and a passageway communicating between the inlet and the outlet.

a reservoir located in the chamber, the reservoir defining a storage chamber for holding a quantity of the beverage, said reservoir further defining an inlet and an outlet in fluid communication with the storage chamber;

a first beverage conduit received in the inlet of the housing and the inlet of the heat exchanger for delivering beverage to the passageway of the heat exchanger;

a second beverage conduit received in the outlet of the heat exchanger for delivering the beverage to the reservoir, the second beverage conduit being received in the inlet of the reservoir; and a third beverage conduit for delivering the beverage from the outlet of the reservoir to the dispensing means.

According to yet another aspect of the present invention, there is provided an apparatus for delivering a beverage under pressure from a container to a dispensing means comprising:

a housing defining a chamber for holding a quantity of a coolant fluid, the housing further defining an inlet and an outlet;

a heat exchanging means located in the chamber, the heat exchanging means defining a beverage passageway having an inlet and an outlet;

a reservoir located in the chamber for holding a quantity of the beverage, the reservoir having an inlet an outlet;

a beverage conduit communicating between the container, the heat exchanging means, the reservoir and the dispensing means to define a beverage flow path from the container through the heat exchanging means and the reservoir to the dispensing means;

a source of coolant fluid for delivering coolant fluid to the housing; and a coolant fluid conduit for communicating between the heat exchange means and the source of coolant fluid to define a flow path between the heat exchange means and the source of coolant fluid.

According to another aspect of the present invention there is provided a method for delivering a beverage under pressure through a distribution line to a dispensing means. The method involves proving a source of beverage under pressure. The method involves delivering the beverage through a heat exchanger and then delivering the beverage to a reservoir that is submerged in a coolant fluid. The method involves storing the beverage in the reservoir and then dispensing the beverage from the reservoir through a dispensing means.

DETAILED DESCRIPTION OF THE INVENTION

Figure 1:
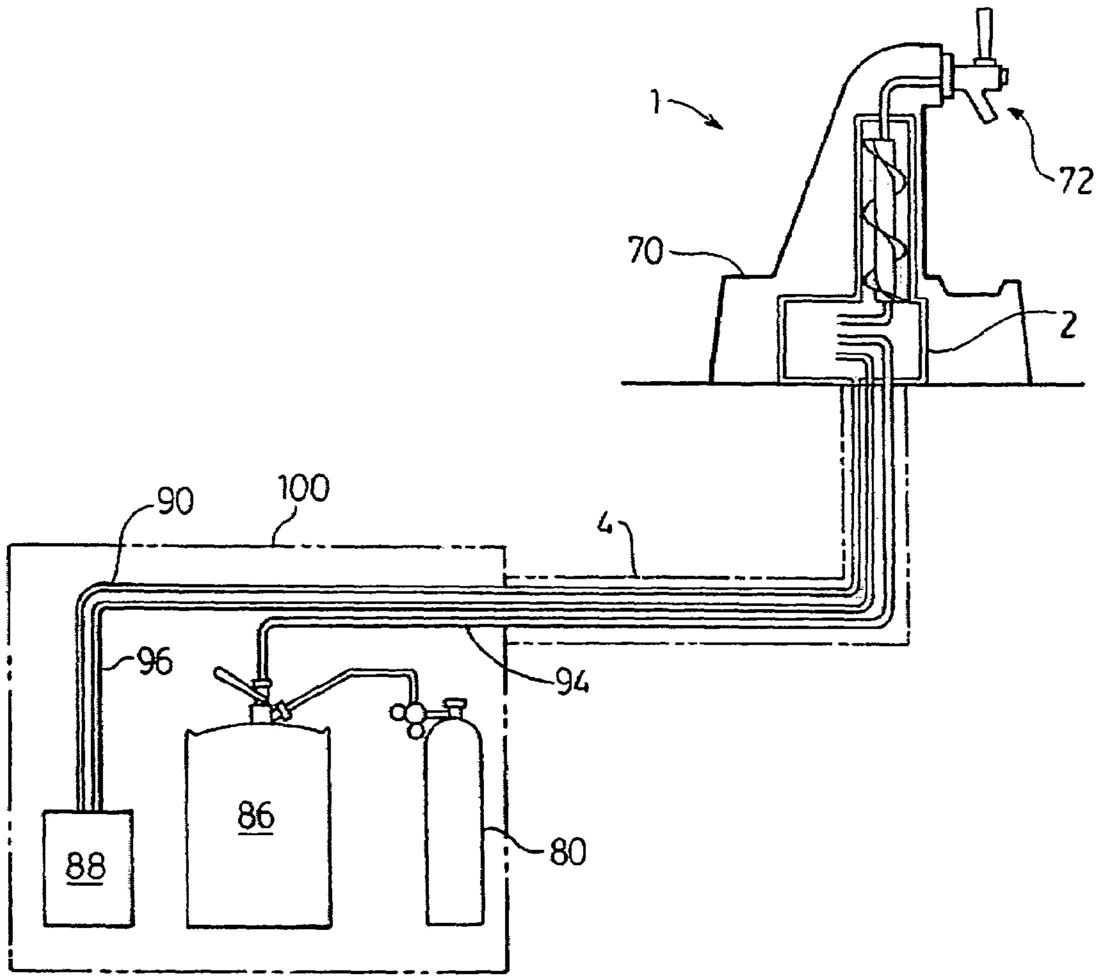
FIG. 1 is a perspective view of a preferred embodiment of a beverage dispensing apparatus of the present invention connected to a beverage container and a source of a coolant fluid.

A preferred embodiment of the present invention is shown in FIG. 1. Apparatus 1 has a housing 2. The apparatus is preferably located in a beverage tower 70 that has a dispensing means 72 which is preferably a dispensing tap.

The apparatus is used in conjunction with a beverage container 86 which is preferably a beer keg. The beverage in the container 86 is preferably kept under pressure by a pressurizing means 80 which is connected to the beverage container 86. In addition, the apparatus 1 is preferably used in combination with a source 88 of coolant fluid. Preferably, the source 88 is a glycol tank and the coolant fluid is glycol. Other coolant fluids such as ice water can also be used for the purposes of the present invention. Preferably, the container 86, the pressurizing means 80 and the source 88 are located in a refrigeration unit 100 such as a walk-in refrigerator.

A beverage conduit 94 communicates between the container and the apparatus 1. A coolant fluid supply conduit 90 and a coolant fluid return conduit 96 communicate between the source 88 and the apparatus 1. Preferably, beverage conduit 94, coolant fluid supply conduit 90 and coolant fluid return conduit 96 are located in close proximity in a trunk line 4 that communicates between the refrigeration unit 100 and the apparatus 1. This provides an additional cooling benefit as the beverage in the beverage conduit is kept in close proximity to the coolant fluid in the coolant fluid supply conduit 90 and the coolant fluid return conduit 96.

Figure 2:
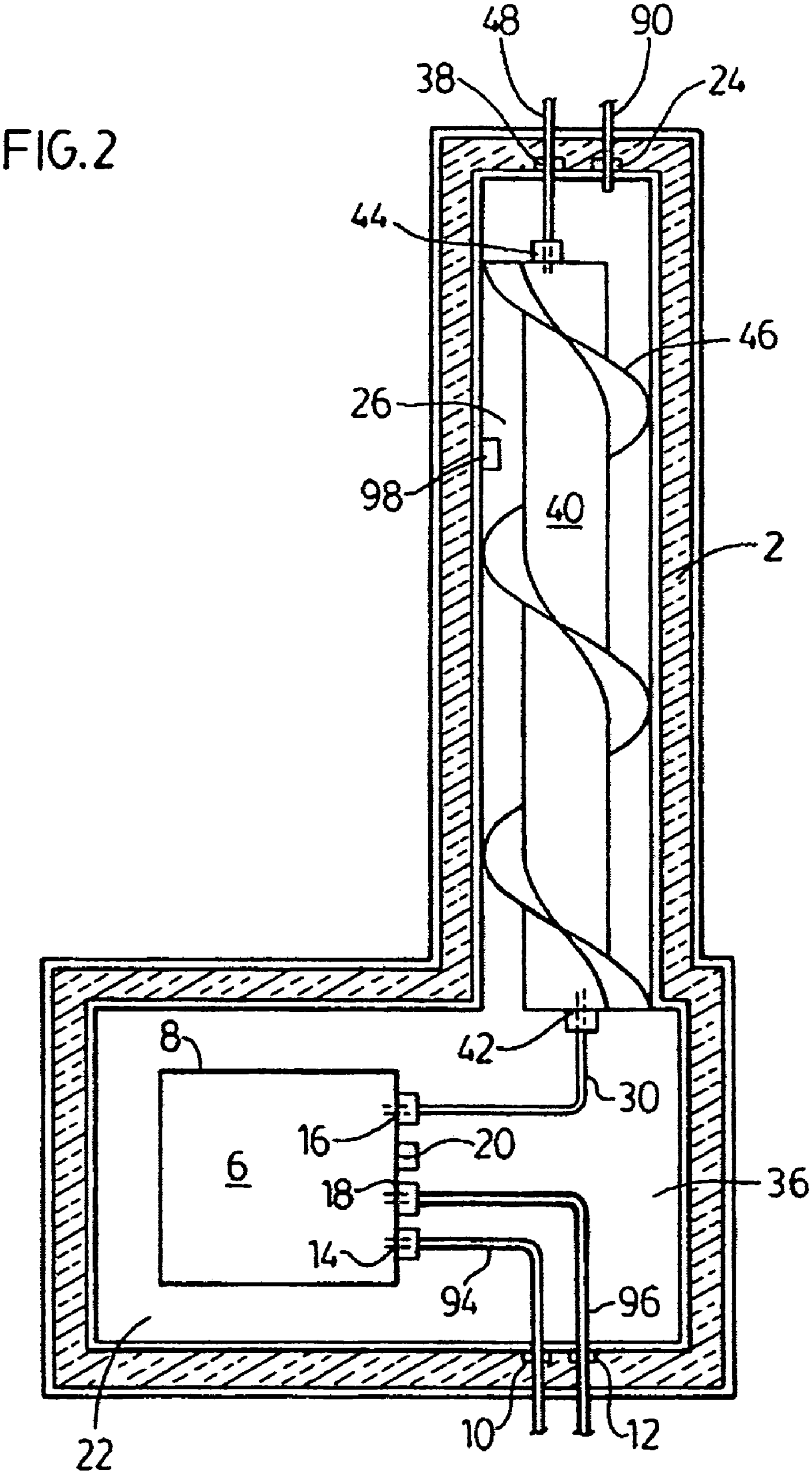
FIG. 2 is a cross-sectional view of the beverage dispensing apparatus of the present invention taken along lines 2—2 of FIG. 1.

As shown in FIG. 2, the housing 2 defines a chamber 36. The housing is preferably insulated. In the preferred embodiment, the chamber is L-shaped having a first section 22 and second section 26. It will be readily appreciated by a person skilled in the art that the chamber need not be of any particular shape nor is it essential that the chamber have discrete sections. The chamber 36 can assume various different shapes for the purposes of the present invention. The housing may also be provided in the form of a tank.

The housing has an inlet 10 for receiving the beverage conduit 94. The housing further defines an outlet 12 for receiving coolant fluid return conduit 96. In addition, the housing has an outlet 38 for receiving a third beverage conduit 48 and an inlet 24 for receiving the coolant fluid supply conduit 90.

A heat exchanger 6 is preferably located in the chamber 36. In the preferred embodiment, the heat exchanger 6 is located in the first section 22 of the chamber 36. In alternate embodiments, it is possible for the heat exchanger 6 to be located outside of the housing 2. In yet another alternate embodiment it is possible to separate the first section 22 of the chamber 36 from the second section 26 of the chamber 36 with a fluid impermeable barrier such that it is possible to fill only the second section 26 of the chamber 36 with a coolant fluid while leaving the first section of the chamber 22 free of coolant fluid.

In the preferred embodiment, the heat exchanger has a housing 8. The heat exchanger 6 is preferably a flat plate heat exchanger known in the art. As is known to a person skilled in the art, a flat plate heat exchanger is a heat exchanger which imparts heat from one liquid to another. This heat exchanger is made from a series of plates that have been corrugated or dimpled to expand heat exchange area. The plates are stacked so that a passageways exist between the plates. Cooling and cooled liquids pass through alternate spaces so that heat exchange area is maximized.

In an alternate embodiment, the heat exchanger can be a coil in tube heat exchanger such that the heat exchanger defines a chamber for holding a quantity of the coolant fluid. In this alternate embodiment, a conduit in the form of a heat exchange coil is located in the chamber of the heat exchanger for transmitting the beverage through the coil thereby permitting heat exchange between the beverage in the coil and the coolant fluid in the chamber of the heat exchanger. The coil is made of an acceptable heat exchanging material known in the art such as stainless steel.

The housing 8 of the heat exchanger 6 has an inlet 14 for receiving the beverage conduit 94. The housing 8 of the heat exchanger 6 further has an outlet 16 for receiving a second beverage conduit 30. The housing 8 of the heat exchanger 6 further defines an inlet 20 for receiving coolant fluid from the chamber 36 and an outlet 18 for receiving the coolant fluid return conduit 96.

In another alternate embodiment of the present invention, the heat exchanger 6 may not have a housing. It is possible to provide a the heat exchanger 6 in the form of a coil in the chamber 36 such that the coil is submerged in the coolant fluid and heat exchange can occur directly in the chamber 36 between beverage flowing through the coil and coolant fluid that is located in the chamber 36.

A reservoir 40 is located in the chamber 36. The reservoir by definition defines a space therein for holding a quantity of liquid beverage. The reservoir 40 is preferably elongate in shape and located in the second section 26 of the chamber 36. However, the reservoir 40 is not to be limited to any particular shape and may be located in any of various locations in the chamber 36. In the preferred embodiment the reservoir has a fin 46 on an exterior surface of the reservoir 40. The fin 46 allows for greater contact area between the reservoir 40 and the coolant fluid in the chamber 36 to enhance heat transfer from the beverage to the coolant fluid. However, in other embodiments, the fin need not be present.

The reservoir 40 defines an inlet 42 for receiving second beverage conduit 30 and an outlet for receiving the third beverage conduit 48. The third beverage conduit 48 conduit is connected to the dispensing means 72.

In the preferred embodiment of the present invention, the coolant fluid is glycol and is delivered from the glycol tank 88 into the chamber 36 through the inlet 24 via the coolant fluid supply conduit 90. The chamber is preferably filled with glycol so that the reservoir 40 and the heat exchanger 6 are completely submerged in glycol. The glycol in the chamber 36 enters the heat exchanger 6 through the inlet 16, circulates through the heat exchanger 6 and leaves the heat exchanger 6 through the coolant fluid return conduit 96. The coolant fluid is circulated back to the source 88 through the coolant fluid return conduit 96 and then re-circulated back to the chamber 36 as discussed above.

In the preferred embodiment, beer is delivered from the container 86 which is a beer keg through the beverage conduit 94 to the housing 2. The beer is then delivered through beverage conduit 94 to the heat exchanger. In the preferred embodiment, the beer enters the coil in the heat exchanger from the beverage conduit 94. Heat exchange occurs between the beer in the coil and the coolant fluid as the beer travels through the coil thereby cooling the beer. The coil is continuous with the second beverage conduit 30 so that the beer leaves the heat exchanger 6 through the second beverage conduit 30. The beer flows through the second beverage conduit 30 into the reservoir 40. The beer remains in the reservoir 40 until the dispensing means 72 is actuated causing the beer to flow through the outlet 44 into the third beverage conduit 48 and through the dispensing means. The reservoir provides an additional cooling benefit as the beer remains in the reservoir and is cooled by the surrounding coolant fluid between pours or dispensing events.

Figure 3:
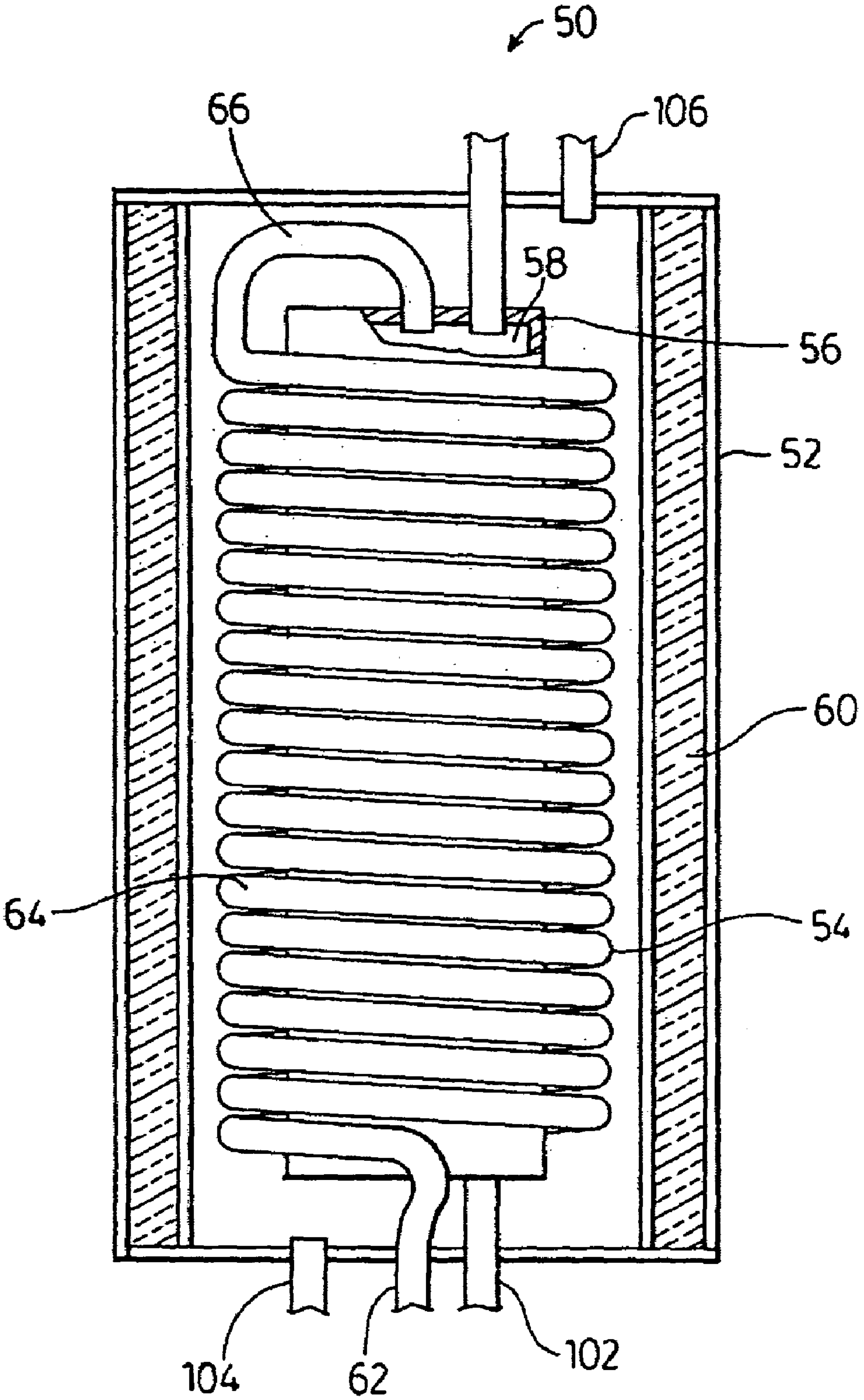
FIG. 3 is a sectional view of an alternate embodiment of the present invention.

An alternate embodiment 50 of an apparatus the present invention is shown in FIG. 3. The alternate embodiment also is used in association with a beverage container in which the beverage is preferably kept under pressure by a pressurizing means. In addition, the apparatus 50 is also preferably used in combination with a source of coolant fluid. Preferably, the container, the pressurizing means and the source of coolant fluid are also located in a refrigeration unit such as a walk-in refrigerator.

The apparatus 50 has a housing 52 preferably having insulation 60. The housing defines a chamber 54. A heat exchange coil 64 is located in the chamber 54. The coil surrounds a reservoir 56 that is also located in the chamber 54. The reservoir defines a reservoir chamber 58. A coolant fluid is introduced into the chamber 54 through conduit 106. The coolant fluid is again preferably glycol. The coolant fluid leaves the chamber through conduit 104.

A probe 98 is preferably located in the second section 26 of the chamber 36. The probe 98 measures the temperature of the coolant fluid and is adapted to preferably cooperate with sensors to send a signal to the refrigeration unit for the coolant fluid so that the refrigeration unit may be alternately turned on or off in order to regulate the temperature of the coolant fluid in the chamber 36.

In operation, the chamber 54 is filled with coolant fluid so that the heat exchange coil 64 is completely submerged in the coolant fluid. The beverage which is again preferably beer enters the coil through conduit 62. The beer flows through the coil where heat exchange occurs between the beer in the coil and the coolant fluid in the chamber 54. The beer flows from the coil 64 through a conduit 66 into the reservoir 56. The beer remains in the reservoir 56 until the dispensing means is actuated causing the beer to flow through conduit 102 to the dispensing means. The reservoir again provides an additional cooling benefit as the beer remains in the reservoir and is cooled by the surrounding coolant fluid between pours or dispensing events.

Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. An apparatus for delivering a beverage under pressure from a container to a dispensing means comprising:

- a heat exchanger defining a first passageway having an inlet and an outlet through which the beverage may be delivered, the heat exchanger further defining a second passageway having an inlet and an outlet for delivering a coolant fluid through the heat exchanger in sufficient proximity to the first passageway to permit heat exchange between the coolant fluid and the beverage;
- a tank for holding a quantity of a coolant fluid;
- a reservoir for holding a quantity of the beverage, the reservoir being located in the tank for submersion in said coolant fluid, the reservoir defining an inlet and an outlet and a passageway between the inlet and the outlet;
- a first conduit for delivering the beverage from the container to the inlet of the first passageway of the heat exchanger;
- a second conduit for delivering beverage from the outlet of the heat exchanger to the inlet of the reservoir;
- a third conduit for delivering beverage from the reservoir to the dispensing means.

2. An apparatus according to claim 1 wherein the heat exchanger is located in the tank for submersion in said coolant fluid.

3. An apparatus according to claim 1 further comprising a a source of coolant fluid and a fourth conduit for delivering the coolant fluid from a source of coolant fluid to the tank.

4. An apparatus according to claim 3 wherein the first conduit is a trunk line comprising a beverage conduit for delivering the beverage from the container to the inlet of the first passageway of the heat exchanger and a coolant fluid conduit for delivering coolant fluid from the outlet of the second passageway of the heat exchanger to a source of coolant fluid, the inlet of the second passageway being in fluid communication with the tank.

5. An apparatus according to claim 4 wherein the tub defines a sub-compartment, the reservoir being located in the sub-compartment wherein a fin is formed on an exterior wall of the reservoir for enhancing circulation of the coolant fluid over the reservoir.

6. An apparatus according to claim 1 wherein pins are attached to an exterior wall of the reservoir to promote heat exchange.

7. An apparatus according to claim 1 wherein the heat exchanger is a shell in tube heat exchanger or a flat plate heat exchanger.

8. An apparatus according to claim 1 wherein the first passageway is a serpentine coil and the second passageway is a space surrounding said coil.

9. An apparatus according to claim 1 wherein the coolant fluid is either water of glycol.

10. An apparatus according to claim 1 wherein the beverage is beer.

11. An apparatus for delivering a beverage under pressure from a container to a dispensing means comprising:

a housing defining a chamber for holding a quantity of a coolant fluid, the housing further defining an inlet and an outlet;

a heat exchanger located in the chamber, the heat exchanger defining a inlet, an outlet and a passageway communicating between the inlet and the outlet.

a reservoir located in the chamber, the reservoir defining a storage chamber for holding a quantity of the beverage, said reservoir further defining an inlet and an outlet in fluid communication with the storage chamber;

a first beverage conduit received in the inlet of the housing and the inlet of the heat exchanger for delivering beverage to the passageway of the heat exchanger;

a second beverage conduit received in the outlet of the heat exchanger for delivering the beverage to the reservoir, the second beverage conduit being received in the inlet of the reservoir; and a third beverage conduit for delivering the beverage from the outlet of the reservoir to the dispensing means.

12. An apparatus according to claim 11 wherein the heat exchanger further includes a housing defining a chamber for holding a quantity of the coolant fluid, the housing defining a coolant fluid inlet and a coolant fluid outlet, and an inlet and an outlet for receiving the passageway, the passageway being a coil located in the chamber.

13. An apparatus according to claim 11 wherein the heat exchanger is a flat plate heat exchanger immersed in the coolant fluid.

14. An apparatus according to claim 11 further comprising a source of coolant fluid, a first coolant fluid conduit for delivering coolant fluid to the chamber and a second coolant fluid conduit received in the second outlet of the heat exchanger for circulating the coolant fluid back to the source of coolant fluid.

15. An apparatus for delivering a beverage under pressure from a container to a dispensing means comprising:

a housing defining a chamber for holding a quantity of a coolant fluid, the housing further defining an inlet and an outlet;

a heat exchanging means located in the chamber, the heat exchanging means defining a beverage passageway having an inlet and an outlet;

a reservoir located in the chamber for holding a quantity of the beverage, the reservoir having an inlet an outlet;

a beverage conduit communicating between the container, the heat exchanging means, the reservoir and the dispensing means to define a beverage flow path from the container through the heat exchanging means and the reservoir to the dispensing means;

a source of coolant fluid for delivering coolant fluid to the housing; and a coolant fluid conduit for communicating between the heat exchange means and the source of coolant fluid to define a flow path between the heat exchange means and the source of coolant fluid.

* * * * *